Aug. 19, 1941.   R. S. DRUMMOND   2,252,841
MACHINE TOOL
Filed Oct. 16, 1939   3 Sheets-Sheet 1

FIG.I.

INVENTOR.
ROBERT S. DRUMMOND
BY Whittemore, Hulbert
& Belknap ATTORNEYS

Aug. 19, 1941.  R. S. DRUMMOND  2,252,841
MACHINE TOOL
Filed Oct. 16, 1939  3 Sheets-Sheet 3
FIG. 3.
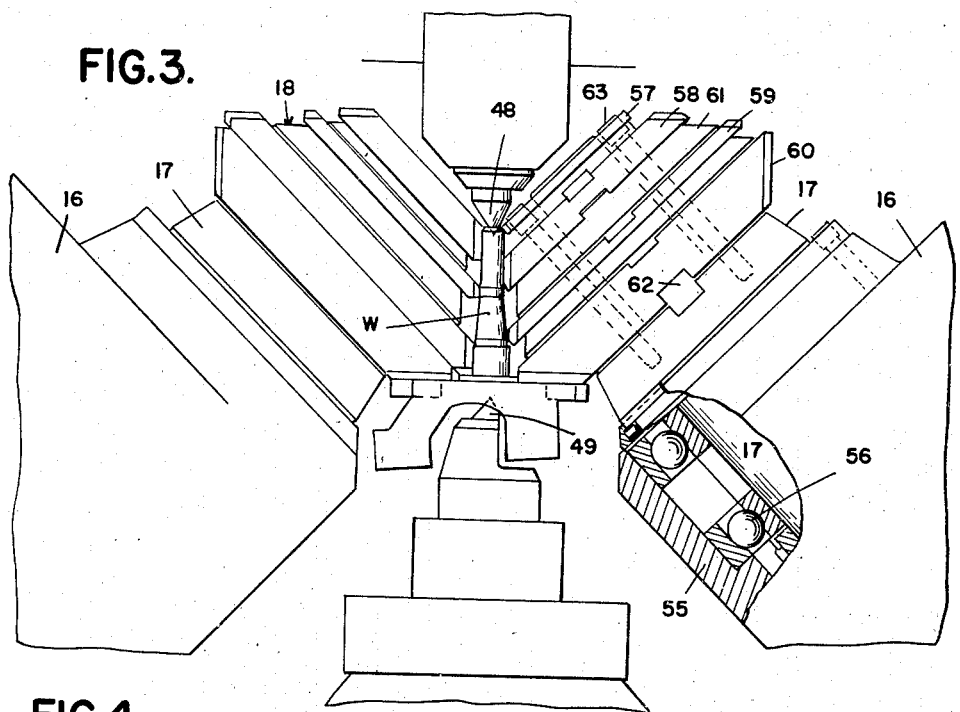
FIG. 4.
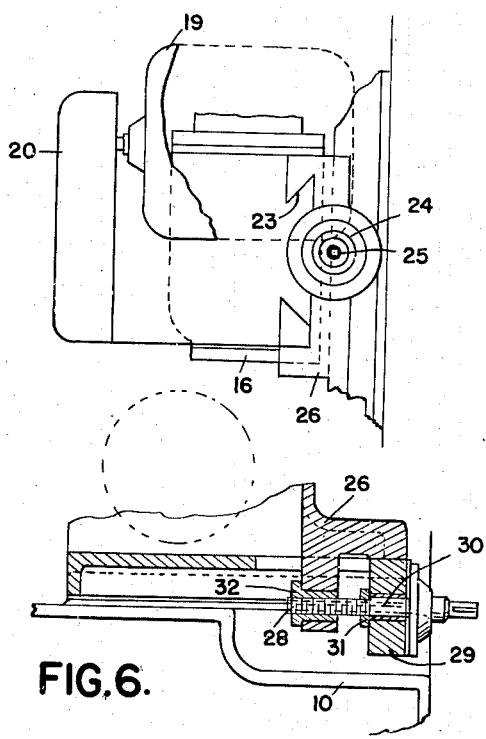
FIG. 5.
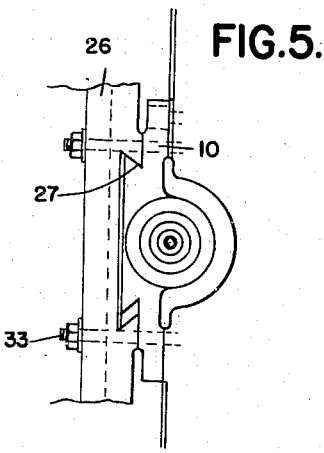
FIG. 6.
INVENTOR.
ROBERT S. DRUMMOND
BY
ATTORNEYS Patented Aug. 19, 1941

2,252,841

UNITED STATES PATENT OFFICE 2,252,841

MACHINE TOOL

Robert S. Drummond, Detroit, Mich., assignor to National Broach & Machine Company, Detroit, Mich., a corporation of Michigan Application October 16, 1939, Serial No. 299,718

23 Claims. (Cl. 90—20)

The present invention relates to a machine tool and more particularly to a metal working machine adapted to finish surfaces of revolution of a work piece.

Briefly described, the machine comprises a frame shaped to provide a housing open only at the front. Within the housing are supported a pair of tool carriages, each adapted to support a rotary tool, and each carrying a motor for driving said tool in rotation. Each of the tool carriages are adjustable, both horizontally toward and away from a work piece, and obliquely toward said work piece. As a result of the two adjustments, the tool carriages may be positioned so as to lock the tool in the proper radial position relative to the work piece, and also at any desired point along the work piece. The axes of the tool spindles are preferably inclined, and are shown herein as inclined at an angle of about 45°.

A work carriage is provided and is mounted on ways for movement to position a work piece intermediate the tools or to move the work piece adjacent the open side of the housing. Preferably, automatic means are provided for moving the work support, and I have herein illustrated this means as comprising a hydraulic cylinder. Suitable means are provided for rotating the work piece at the desired speed.

With the foregoing general description in mind, it is accordingly an object of the present invention to provide a machine tool having a work support and a rotary tool support adjustable, both toward and away from, and along, the work piece.

It is a further object of the present invention to provide a machine tool comprising a housing open only at one side, provided with a tool within the housing, and a work support movable from a loading position adjacent the open side of the housing to a working position within the housing.

It is a further object of the present invention to provide a machine tool comprising a frame having a movable work support slidable in said frame, said work support being C-shaped and slidably mounted in ways at both the top and bottom thereof.

Other objects of the invention will be apparent as the description proceeds, and when taken in conjunction with the accompanying drawings, wherein:

Figure 3 is an enlarged fragmentary view illustrating the relationship between tools and the work piece;

Figure 4 is a fragmentary elevation taken in the direction of the arrows 4—4, Figure 1;

Figure 5 is a fragmentary elevation taken in the direction of the arrows 5—5, Figure 1; and Figure 6 is a fragmentary section on the line 6—6, Figure 1.

Figure 1:
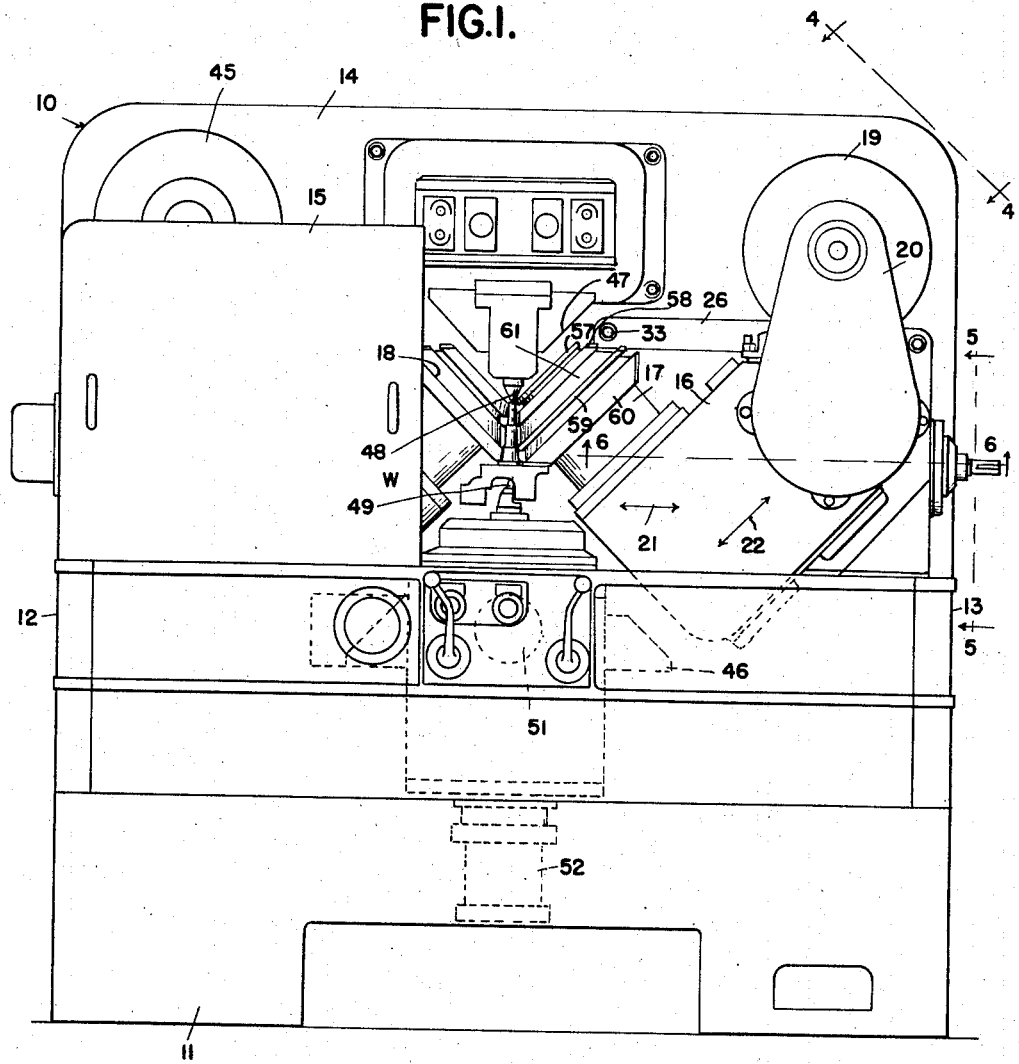
Figure 1 is a front elevation of my improved machine tool.

The machine tool embodied in my present invention is illustrated in the figures as comprising a frame generally indicated at 10, which comprises a base 11, ends 12 and 13, and a top 14. The frame 10 is closed at the rear so as to provide a housing open only at its front. The open front of the housing is intended to be closed by suitable means, such for example as slidable doors 15.

A pair of tool carriages 16 are adjustably supported within the housing. Each tool support comprises a tool spindle 17 adapted to support a cutting tool or an assembly of cutting tools 18, and a motor 19 for driving the tools in rotation. In Figure 1 I have illustrated at 20 a cover for receiving a belt, or chain, or gear connection intermediate the motor 19 and the spindle 17. It will be appreciated that the spindle 17 may be driven at a desired speed by providing suitable change gears intermediate the motor 19 and the spindle 17. The specific drive employed forms no part of the present invention and is therefore not illustrated in detail.

As indicated in Figures 1 and 3, the axes of the spindles 17 are inclined relative to the axis of the work piece. In these figures I have illustrated the axis as inclined at an angle of about 45° to the vertical, although it will be appreciated that this angle may be varied as desired. The tool spindles 17, as will be observed at this point, are coplanar, and all adjustments thereof occur in the same plane.

Means are provided for adjusting the tool carriage 16 in the horizontal direction toward and away from the work piece, as indicated by the double arrow 21, and also in a direction perpendicular to the axis of the spindles 17, as indicated by the double arrow 22. These adjusting means are illustrated in detail in Figures 4 to 6.

Referring specifically to Figure 4, the tool carriage 16 is illustrated as slidable in ways 23, which extend in a direction perpendicular to the axis of the spindle 17. In this figure I have indicated the motor 19 and cover 20, previously referred to. Suitable means indicated generally at 24 are provided for adjusting the tool carriage 16 along the ways 23. The means 24 may conveniently take the form of a rotatable feed screw, provided with a squared head 25, cooperating with a fixed threaded member rigidly carried by an adjustable plate 26, later to be described. I have not illustrated this means in connection with Figure 4, but it is similar to the adjusting means illustrated in Figure 6, and need not further be described. It is sufficient to note that by rotation of the feed screw 25 the tool carriage 16 may be adjusted along the ways 23 to position the tool 18 in a predetermined relationship to a work piece to be machined. If desired, or if necessary, suitable locking means may be employed, such as locking bolts, to insure rigidity of the tool support after adjustment.

The means for adjusting the carriage 16 in a horizontal direction is illustrated in Figures 5 and 6. It may be noted that the ways 23, shown in Figure 4 and referred to above, are provided in an intermediate plate 26, which in turn is slidably mounted on the frame 10 of the machine. As seen in Figure 5, cooperating ways 27 are formed in the plate 26 and the frame 10. These ways extend horizontally and provide for adjustment of the plate 26, and hence of the tool carriage 16 in a horizontal direction toward or away from the work support. The means for adjusting the plate 26 toward and away from the work spindle, comprises a feed screw 28 having a squared end adapted to be engaged by a suitable tool for rotating the feed screw. The feed screw 28 is mounted for rotation in a projection 29 formed on the frame 10 of the machine tool. As indicated, the feed screw has an enlarged portion 30 against which is abutted a locking ring 31 which retains the feed screw against axial displacement, while permitting free rotation thereof. An internally threaded bushing 32 is carried by a projection of the plate 26, as is indicated in Figure 6, and is held therein against rotation. As will be evident, rotation of the feed screw 28 will cause the plate 26 to be moved along the ways 27. The order to lock the plate 26 firmly in adjusted position, clamping bolts 33 are provided. A similar arrangement, as previously suggested, may be employed to lock the tool carriage 16 rigidly in position on the plate 26 after adjustment along the ways 23.

The means for supporting the work piece comprises a deep C-shaped element 40 having forwardly projecting ends 41 and 42 which support a tailstock 43 and the power headstock 44, respectively. The upper arm of the C-shaped work supporting frame 40 carries a motor 45 which is connected by suitable gearing (not shown) to the power headstock 44. If preferred, motor 45 may be connected to drive the upper stock 43.

Figure 2:
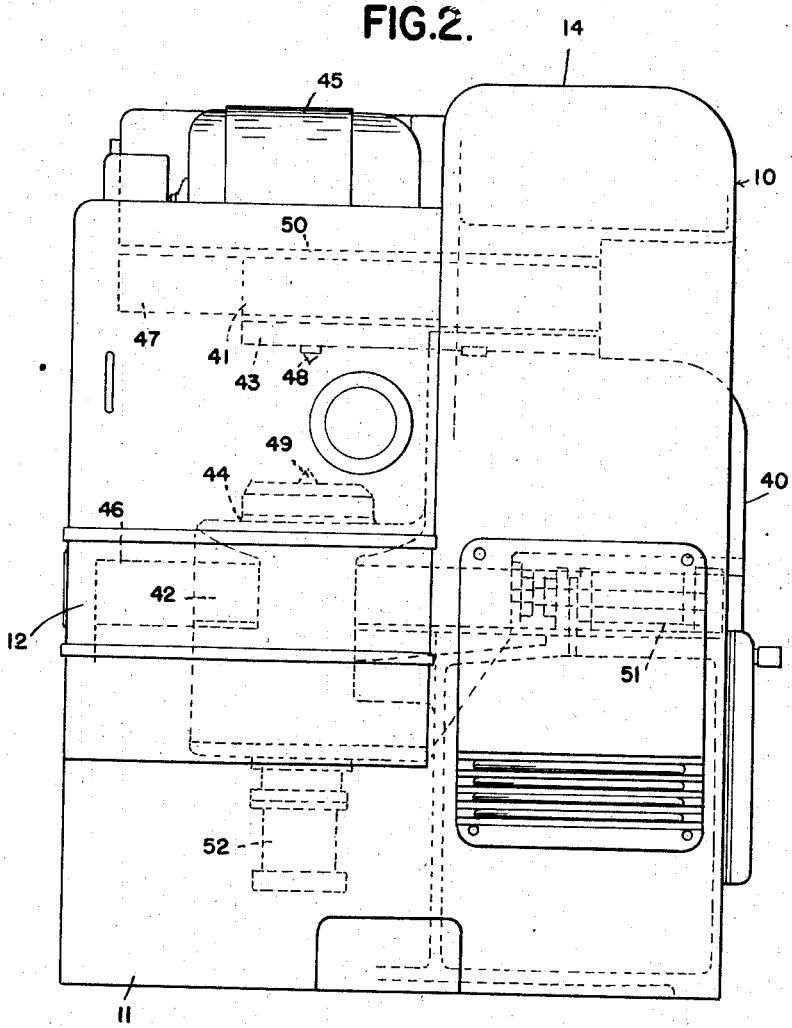
Figure 2 is a side elevation of my improved machine tool.

As indicated in Figure 2, the C-shaped work supporting frame 40 is relatively deep and is supported throughout a substantial area, both at the top and bottom. Referring to Figure 1, I have indicated lower ways 46 and upper ways 47 for slidably supporting the frame 40. It will be observed that the work supporting frame 40 is a rigid, heavy piece so that a work support held between the centers 48 and 49 will be rigidly retained without substantial vibration. A wear plate 50 is interposed between the upper arm 41 of the work supporting bracket and the frame of the machine.

Referring now to Figure 2, I have illustrated at 51 a hydraulic cylinder for controlling movement of the work support 40. It is evident, of course, that other feeding means could be substituted, but in the present instance I prefer to employ hydraulic means for this purpose. I also provide a hydraulic cylinder 52 which is arranged to elevate or lower the power headstock 44. This cylinder is employed for loading purposes. A work piece is positioned on the center 49 and the cylinder 52 is then energized to elevate power headstock 44 in a manner to cause the work piece to be clamped between centers 48 and 49. As will be obvious, the work support is in forward position, readily accessible through the open front of the housing for this operation. After the work piece has been clamped between centers, the work support 40 is caused to move rearwardly to center the work piece between the opposed cutters 18.

Preferably the cutting operation to be performed on the present machine is effected by a continuous rotation of the tool spindles 17. The power headstock 44 is retained against rotation, while the work piece is fed rearwardly so as to position the work piece intermediate the cutters 18. As soon as the work piece has been thus positioned, it is caused to rotate at a slow speed, either a half or a full revolution, or slightly more, thus machining the work piece to the desired dimensions. If preferred, the work piece may be continuously rotated while it is fed into position between the cutters. It will also be noted that the present machine is adapted to perform a cutting operation in which the work piece is first moved rearwardly to cutting position, after which the tools, while being rotated, may be fed inwardly along the ways 23 in the direction of the arrow 22. This last operation may be performed to obtain a plunge cut, and preferably where this feeding motion is employed, the work is rotated at a substantial speed; the rate of feed of the tool is reduced near depth; and at depth the tool is maintained without further feed for a substantial interval to provide a dwell which insures accurate finishing of the part.

From the foregoing, it will be noted that the essential operative motion of the parts are a movement of the work support forwardly and rearwardly between loading and cutting positions; movement of the tool carriages in a direction perpendicular to the axis of the work piece, as indicated by the arrow 21, and a second movement of the tool carriage oblique to the axis of the work piece, as indicated by the arrow 22. In the present embodiment I have illustrated the last two adjustments as being obtained manually, and the first mentioned movement as being obtained by means of a hydraulic actuator. In addition there is a vertical movement of the headstock 44 relative to the tailstock 43 for the purpose of loading and unloading the work piece. Further, there is, of course, a rotational movement of both the work support and tool supports.

Referring now particularly to Figure 3, I show an enlarged elevation, partly in section, of the relationship between the cutters and a work piece W, herein illustrated as a steering knuckle. The tool spindle 17 is shown as mounted in the sleeve 55, suitable antifriction bearings 56 being provided. The tool assembly indicated generally at 18 comprises a number of separate cutters 57, 58, 59 and 60, suitable spacers 61 being provided intermediate adjacent cutters. The various cutters are assembled on a projecting portion of the tool spindle 17 and are locked together by suitable keys, or the like, indicated at 62. The assembly is rigidly retained in position by locking bolts 63. It will be observed that the right and left-hand cutter assemblies are different, and in this connection it may be mentioned that an effort is made to distribute the work between the two cutter assemblies, and also to distribute the work of each cutter assembly from one end to the other of the tool. Thus it will be seen that both cutter assemblies are provided with cutters for cutting adjacent both the top and bottom of the work piece W, and each also has cutters adapted to operate on the surface intermediate the ends of the work piece. This arrangement reduces lateral thrusts on the work piece and tends to counterbalance the forces developed by the cutting action. In this manner the work piece is retained without excessive strain on the head and tailstock, and vibration and deflection are reduced to a minimum.

I have not considered it necessary in the present description to illustrate or describe in detail the automatic mechanism for controlling the feed of the work carriage 40 to a position between the tools, since this feeding means may, if desired, be of known commercial type. In like manner I have not illustrated automatic controls for initiating the rotation of the work piece after it has been properly positioned intermediate the cutter, since the provision of suitable controls for energizing and deenergizing the motor 25, in accordance with travel of the work piece to and from working position, will offer no difficulties to those skilled in this art.

While I have illustrated and described several specific embodiments of my invention, it will be apparent to those skilled in the art that various additions, modifications, omissions, combinations and substitutions may be made which will be within the spirit and scope of my invention as defined by the appended claims.

What I claim as my invention is:

1. A machine tool comprising a frame providing a housing open at the front; a pair of tool spindles in said housing; means for adjusting each of said spindles along intersecting paths; means for rotating said spindles; a work support mounted for travel in a direction perpendicular to said paths, from a working position intermediate said tool spindles to a loading position toward the open side of said housing; and means for rotating said tool spindles.

2. A machine tool comprising a frame providing a housing open at the front; a pair of tool spindles in said housing; means for adjusting each of said spindles in a common plane along intersecting paths; means for rotating said spindles; a work support mounted for travel in a direction perpendicular to said plane, from a working position intermediate said tool spindles to a loading position toward the open side of said housing; means for rotating said tool spindle; and a cover adapted to close the open side of said housing during a cutting operation.

3. In a machine tool, a work support, means for rotating said work support, a rotary tool support, a carriage for said tool support, means mounting said carriage for adjustment toward and away from said work support in a direction perpendicular to its axis, and independently adjustable means for moving said carriage in a direction oblique to the axis of said work support.

4. A machine tool comprising a rotary work support movable in a direction perpendicular to its axis between loading and working positions, a rotary tool support movable in a plane perpendicular to the direction of movement of said work support, means for adjusting said tool support in said plane in a direction perpendicular to the axis of said work support, and independently adjustable means for moving said tool support in said plane in a direction transverse to the first mentioned direction of adjustment of said tool support.

5. A machine tool comprising a rotary work support movable in a direction perpendicular to its axis between loading and working positions, hydraulic means for moving said work support between said positions, a rotary tool support movable in a plane perpendicular to the direction of movement of said work support, means for adjusting said tool support in said plane in a direction perpendicular to the axis of said work support, and independently adjustable means for moving said tool support in said plane in a direction transverse to the first mentioned direction of adjustment of said tool support.

6. A machine tool comprising a rotary work support movable in a direction perpendicular to its axis between loading and working positions, a rotary tool support movable in a plane perpendicular to the direction of movement of said work support, means for adjusting said tool support in said plane in a direction perpendicular to the axis of said work support, and independently adjustable means for moving said tool support in said plane in a direction oblique to the first mentioned direction of adjustment of said tool support.

7. A machine tool comprising a rotary work support movable in a direction perpendicular to its axis between loading and working positions, a pair of opposed tool supports movable in a plane perpendicular to the direction of movement of said work support, means for adjusting each of said tool supports in said plane in a direction perpendicular to the axis of said work support, and independently adjustable means for moving each of said tool supports in said plane in a direction transverse to the first mentioned direction of adjustment of said tool support.

8. In a machine tool, a work support, means for rotating said work support, a rotary tool support having its axis inclined to the axis of said work support, a carriage for said tool support, means mounting said carriage for adjustment toward and away from said work support in a direction perpendicular to its axis, and independently adjustable means for moving said carriage in a direction oblique to the axis of said work support.

9. A machine tool comprising a rotary work support movable in a direction perpendicular to its axis between loading and working positions, a rotary tool support movable in a plane perpendicular to the direction of movement of said work support and having its axis inclined in said plane to the axis of said work support whereby to engage a conical cutter with a cylindrical surface of said work piece, means for adjusting said tool support in said plane in a direction perpendicular to the axis of said work support, and independently adjustable means for moving said tool support in said plane in a direction transverse to the first mentioned direction of adjustment of said tool support.

10. A machine tool comprising a frame providing a housing open only at the front; a rotary work support movable between a working position within said housing, and a loading position adjacent the open front of said housing; a pair of rotary tool supports within said housing, the axes of said tool supports occupying a common plane perpendicular to the direction of movement of said work support, and being inclined to the axis of said work support; and means for adjusting said tool supports in said plane toward and away from said work support.

11. A machine tool comprising a frame providing a housing open only at the front; a rotary work support movable between a working position within said housing, and a loading position adjacent the open front of said housing; a pair of rotary tool supports within said housing, the axes of said tool supports occupying a common plane perpendicular to the direction of movement of said work support, and being inclined to the axis of said work support; and means for adjusting said tool supports in said plane toward and away from said work support, said means comprising non-parallel ways for each of said tool supports.

12. A machine tool comprising a frame providing a housing open only at the front, a rotary work support movable between a working position within said housing, and a loading position adjacent the open front of said housing; a pair of rotary tool supports within said housing, the axes of said tool supports occupying a common plane perpendicular to the direction of movement of said work support, and being inclined to the axis of said work support; and means for adjusting said tool supports in said plane toward and away from said work support, said last means comprising first ways perpendicular to the axis of said work support, and second ways transverse to said first ways.

13. A machine tool comprising a frame providing a housing open only at the front; a rotary work support movable between a working position within said housing, and a loading position adjacent the open front of said housing; a pair of rotary tool supports within said housing, the axes of said tool supports occupying a common plane perpendicular to the direction of movement of said work support, and being inclined to the axis of said work support; and means for adjusting said tool supports in said plane toward and away from said work support, said last means comprising first ways perpendicular to the axis of said work support, and second ways oblique to said first ways.

14. A machine tool comprising a frame providing a housing open only at the front; a work support in the form of a rigid C-shaped member having its open side extending toward the front of said housing and providing opposed head and tailstock members, ways for slidably supporting said work support and adapted to engage the same adjacent both top and bottom; and a pair of opposed tool supports between which said work support is slidable on said ways.

15. A machine tool comprising a frame providing a housing open only at the front; a work support in the form of a rigid C-shaped member having its open side extending toward the front of said housing and providing opposed head and tailstock members; ways for slidably supporting said work support and adapted to engage the same adjacent both top and bottom; a pair of opposed tool supports between which said work support is slidable on said ways; hydraulic means for feeding said work support so as to position a work piece carried thereby intermediate said tool supports; and means for rotating said work support and said tool supports.

16. A machine tool comprising a frame providing a housing open only at the front; a work support in the form of a rigid C-shaped member having its open side extending toward the front of said housing and providing opposed head and tailstock members; ways for slidably supporting said work support and adapted to engage the same adjacent both top and bottom; a pair of opposed tool supports between which said work support is slidable on said ways; hydraulic means for feeding said work support so as to position a work piece carried thereby intermediate said tool supports; and means for rotating said work support and said tool supports; said tool supports having their axes inclined to the axis of said work support; and means for independently adjusting each of said tool supports both along, and toward and away from, said work support.

17. A machine tool comprising a rotary work support movable in a direction perpendicular to its axis between loading and working positions, a rotary tool support movable in a plane perpendicular to the direction of movement of said work support, means for adjusting said tool support in said plane in a direction perpendicular to the axis of said work support, independently adjustable means for moving said tool support in said plane in a direction transverse to the first mentioned direction of adjustment of said tool support, and a tool drive motor for rotating a tool carried by said rotary tool support mounted on said support and movable therewith.

18. In a machine tool, a work support, means for rotating said work support, a rotary tool support having its axis inclined to but coplanar with the axis of said work support when said work support is in working position, a carriage for said tool support, means mounting said carriage for adjustment toward and away from said work support in a direction perpendicular to the axis of said work support, and independently adjustable means for moving said carriage in a direction oblique to the axis of said work support.

19. A machine tool comprising a work support, having a work spindle thereon, a pair of opposed tool carriages on opposite sides of said work spindle, tool spindles on said tool carriages, means for adjusting said tool carriages in a direction perpendicular to the axis of said work spindle, and other means for moving said tool carriages in the plane containing the axis of said work spindle in working position and in directions oblique to the axis of said work spindle.

20. In a machine tool, a frame, a work support having a rotary work spindle thereon, said work support being movable on said frame between loading and working positions in a direction perpendicular to the axis of said work spindle, a tool carriage on said frame, a rotary tool spindle on said tool carriage, and means for moving said tool carriage on said frame in a plane containing the axis of said work spindle in working position in a direction oblique to the axis of said work spindle.

21. In a machine tool, a frame, a work support having a rotary work spindle thereon, said work support being movable on said frame between loading and working positions in a direction perpendicular to the axis of said work spindle, a tool carriage on said frame, a rotary tool spindle on said tool carriage, and means for moving said tool carriage on said frame in a plane containing the axis of said work spindle in working position, said means comprising mechanism for moving said tool carriage in a direction perpendicular to the axis of said work spindle in working position, and other mechanism for moving said tool carriage in a direction oblique to the axis of said work spindle in working position.

22. In a machine tool, a frame having work supporting and tool supporting ways thereon extending at right angles, a work carriage mounted in said work supporting ways for movement therein, a sub-base mounted in said other ways for movement therein, ways in said sub-base occupying a plane perpendicular to said work supporting ways and extending obliquely with respect to said tool supporting ways, and a tool carriage mounted for movement in said last recited ways.

23. In a machine tool, a rotary work spindle movable in a direction perpendicular to the axis of said spindle, a rotary tool spindle obliquely related to said work spindle, means for adjusting said tool spindle toward or away from the path of movement of said work spindle in a direction perpendicular to said path, and other means for moving said tool spindle toward and away from the path of movement of said work spindle in a plane perpendicular to the said path, and in a direction perpendicular to the axis of said tool spindle.

ROBERT S. DRUMMOND.